US012049081B2

(12) United States Patent
Konishi et al.

(10) Patent No.: US 12,049,081 B2
(45) Date of Patent: Jul. 30, 2024

(54) LIQUID EJECTING HEAD AND METHOD OF MANUFACTURING LIQUID EJECTING HEAD

(71) Applicant: TOSHIBA TEC KABUSHIKI KAISHA, Tokyo (JP)

(72) Inventors: Tsubasa Konishi, Sunto Shizuoka (JP); Masashi Shimosato, Mishima Shizuoka (JP); Isao Suzuki, Mishima Shizuoka (JP); Makoto Oguma, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 4 days.

(21) Appl. No.: 17/729,922

(22) Filed: Apr. 26, 2022

(65) Prior Publication Data

US 2023/0063950 A1 Mar. 2, 2023

(30) Foreign Application Priority Data

Aug. 26, 2021 (JP) ................................ 2021-138417

(51) Int. Cl.
*B41J 2/14* (2006.01)
*B41J 2/16* (2006.01)

(52) U.S. Cl.
CPC ......... *B41J 2/14032* (2013.01); *B41J 2/1623* (2013.01); *B41J 2002/14411* (2013.01); *B41J 2002/14491* (2013.01)

(58) Field of Classification Search
CPC .................. B41J 2/14032; B41J 2/1623; B41J 2002/14411; B41J 2002/14491; B41J 2/1609; B41J 2/1631; B41J 2/1632; B41J 2/14209; B41J 2002/14362
See application file for complete search history.

(56) References Cited

U.S. PATENT DOCUMENTS 8,025,368 B2 9/2011 Watanabe
8,403,462 B2 3/2013 Watanabe
2020/0290354 A1 9/2020 Shimosato

FOREIGN PATENT DOCUMENTS

JP 2016159441 A * 9/2016 .......... B41J 2202/10
JP 2016159441 A 9/2016

OTHER PUBLICATIONS

U.S. Appl. No. 17/746,888, filed May 17, 2022.
Extended European Search Report dated Nov. 17, 2022, mailed in counterpart European Application No. 22180171.5, 8 pages.

* cited by examiner

*Primary Examiner* — Lisa Solomon
(74) *Attorney, Agent, or Firm* — Kim & Stewart LLP

(57) ABSTRACT

According to one embodiment, a liquid ejection head includes an actuator with a plurality of pressure chambers and dummy chambers. The pressure chambers are each part of a groove that is disposed between an adjacent pair of sidewalls. Each pressure chamber is in fluid communication with a nozzle for ejecting a liquid. The dummy chambers are each between an adjacent pair of pressure chambers. A common chamber is fluidly connected to an end of each of the pressure chambers. A throttle portion is at the end portion of each pressure chamber. Each throttle portion blocks a part of a liquid flow path from the first common chamber to the pressure chamber. The first throttle portion is formed of a resin material.

20 Claims, 12 Drawing Sheets

<TEST EXAMPLE 1>

<TEST EXAMPLE 2>

<TEST EXAMPLE 1>

<TEST EXAMPLE 3>

DRIVE WAVEFORM

NOZZLE FLOW RATE OSCILLATION

EJECTION VOLUME

MENISCUS RETURN CHARACTERISTICS

LIQUID EJECTING HEAD AND METHOD OF MANUFACTURING LIQUID EJECTING HEAD

CROSS-REFERENCE TO RELATED APPLICATION

This application is based upon and claims the benefit of priority from Japanese Patent Application No. 2021-138417, filed Aug. 26, 2021, the entire contents of which are incorporated herein by reference.

FIELD

Embodiments described herein relate generally to a liquid ejection head and a method of manufacturing a liquid ejection head.

BACKGROUND

There is an increasing demand for a liquid ejection head, such as an inkjet head, to achieve higher productivity. To improve the productivity, speed and/or amount of liquid droplets, such as ink droplets, being ejected from nozzles need to be increased. For example, an inkjet head of a shear-mode, shared wall type has higher power and is suitable for ejecting higher-viscosity ink or ejecting larger ink droplets. The inkjet head of this type generally adopts a so-called 3-cycle driving technique where the same drive column is shared by two pressure chambers so that ⅓ of a plurality of chambers can be simultaneously driven for purposes of ejection.

A so-called independent drive head has also been developed. The independent drive head has a dummy pressure chamber on right and left sides of a to-be-driven pressure chamber and drives one pressure chamber by two independent drive columns. As one example configuration, a plurality of grooves are formed in a piezoelectric body, and entrances or openings of every other groove are blocked. The grooves are independently driven such that the grooves with unblocked, open entrances function as pressure chambers and the grooves with the blocked entrances function as air chambers that are the dummy chambers.

In the liquid ejection head or the inkjet head of the shear-mode, shared wall type or of the independent drive head type, ink is replenished from a common liquid chamber into the pressure chamber after droplet ejection. Such ink replenishment may, however, cause a meniscus to swell at an ejection nozzle due to overshooting. As fluid resistance of a flow path from the common liquid chamber to the nozzle decreases, the amount of overshooting increases. Unless the overshooting is suppressed, ink cannot be ejected with a stable meniscus. Therefore, to increase the speed and/or amount of droplet ejection, meniscus swelling must be reduced in a sufficiently rapid manner to ensure stable ejection characteristics.

DETAILED DESCRIPTION

Figure 1:
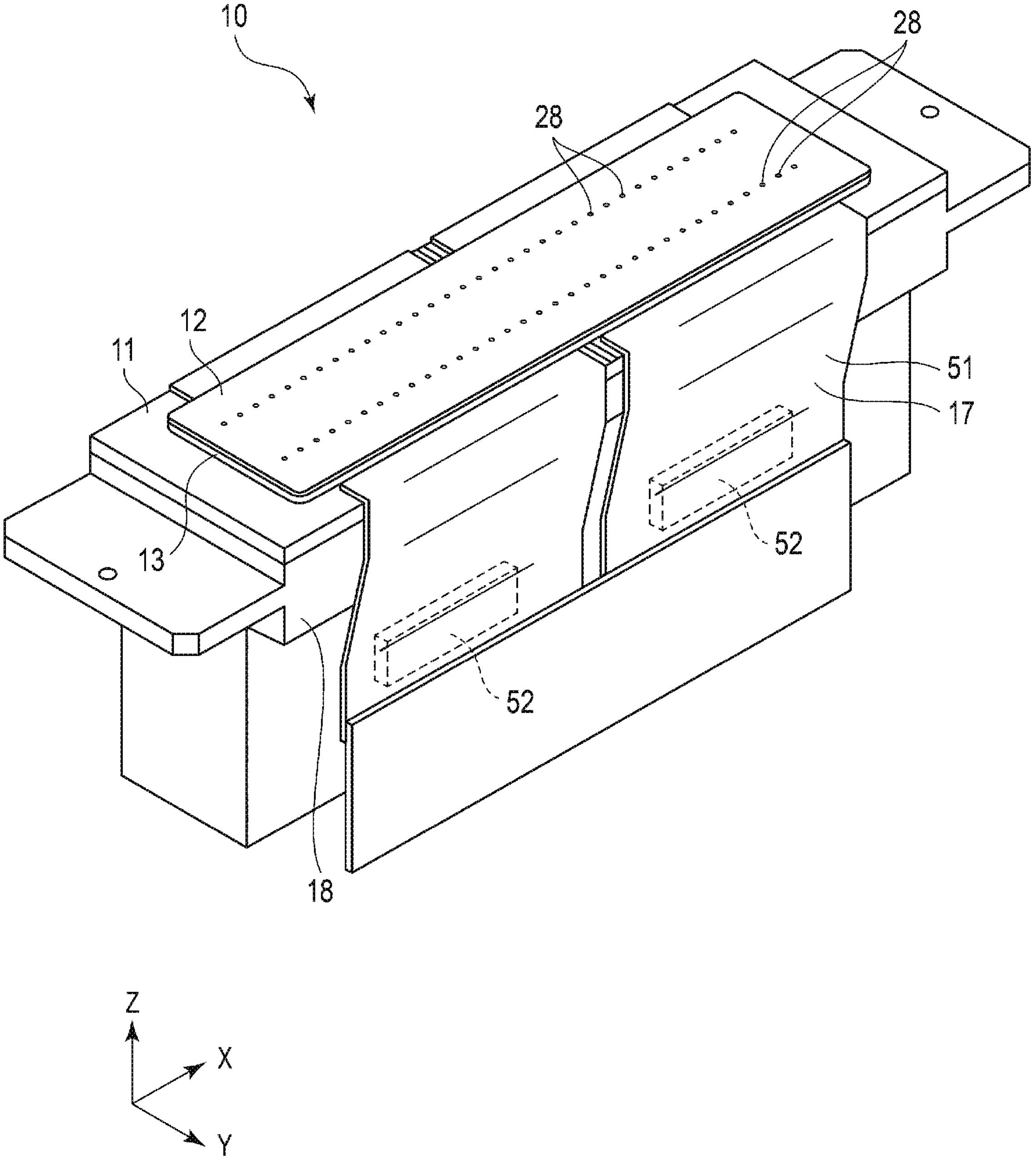
FIG. 1 depicts an inkjet head in a perspective view according to an embodiment.

Certain embodiments provide a liquid ejection head capable of ensuring stable ejection characteristics and a method of manufacturing such a liquid ejection head.

According to one embodiment, a liquid ejection head includes an actuator with a plurality of pressure chambers and a plurality of dummy chambers. The pressure chambers are each portions of a groove disposed between an adjacent pair of sidewalls. Each pressure chamber is in fluid communication with a nozzle for ejecting a liquid. The dummy chambers are each between an adjacent pair of pressure chambers. A first common chamber is fluidly connected to an end of each of the pressure chambers. A first throttle portion is at a first end portion of each pressure chamber. Each throttle portion blocks a part of a liquid flow path from the first common chamber to the pressure chamber. The first throttle portion is a resin material.

Hereinafter, a configuration of an inkjet head 10 as an example of a liquid ejection head according to an embodiment will be described with reference to FIGS. 1 to 5. In the drawings, X, Y, and Z represent, respectively, a first direction, a second direction, and a third direction that are perpendicular to each other. In the present embodiment, certain directions will be described with respect to a posture of an inkjet head 10: a direction in which nozzles 28 and pressure chambers 31 of the inkjet head 10 are arranged is along the X-axis; a direction in which the pressure chambers 31 extend is along the Y-axis; and a direction in which ink (as one example of liquid) is ejected is along the Z-axis. Embodiments of the disclosure are not limited to the present embodiment.

As illustrated in FIGS. 1 to 4, the ink jet head 10 is of a shear-mode shared wall type with a so-called side shooter design (herein may also be referred to as a side shooter type). The inkjet head 10 is a device for ejecting ink and is mounted, for example, in an inkjet printer. The inkjet head 10 of the present embodiment is of an independent drive head type where pressure chambers 31 and dummy chambers 32 are alternately provided. The dummy chambers 32 are air chambers to which ink is not supplied and do not include nozzles 28 for ink ejection.

The inkjet head 10 includes an actuator base 11, a nozzle plate 12, and a frame 13. The actuator base 11 is an example of a base where actuators 22 are provided. In the inkjet head 10, an ink chamber 27 to which ink is supplied is also provided.

Further, the inkjet head 10 includes a circuit board 17 that controls the inkjet head 10 and a manifold 18 that forms a part of a path between the inkjet head 10 and an ink tank (not separately depicted). The inkjet head 10 may include other components as appropriate.

Figure 2:
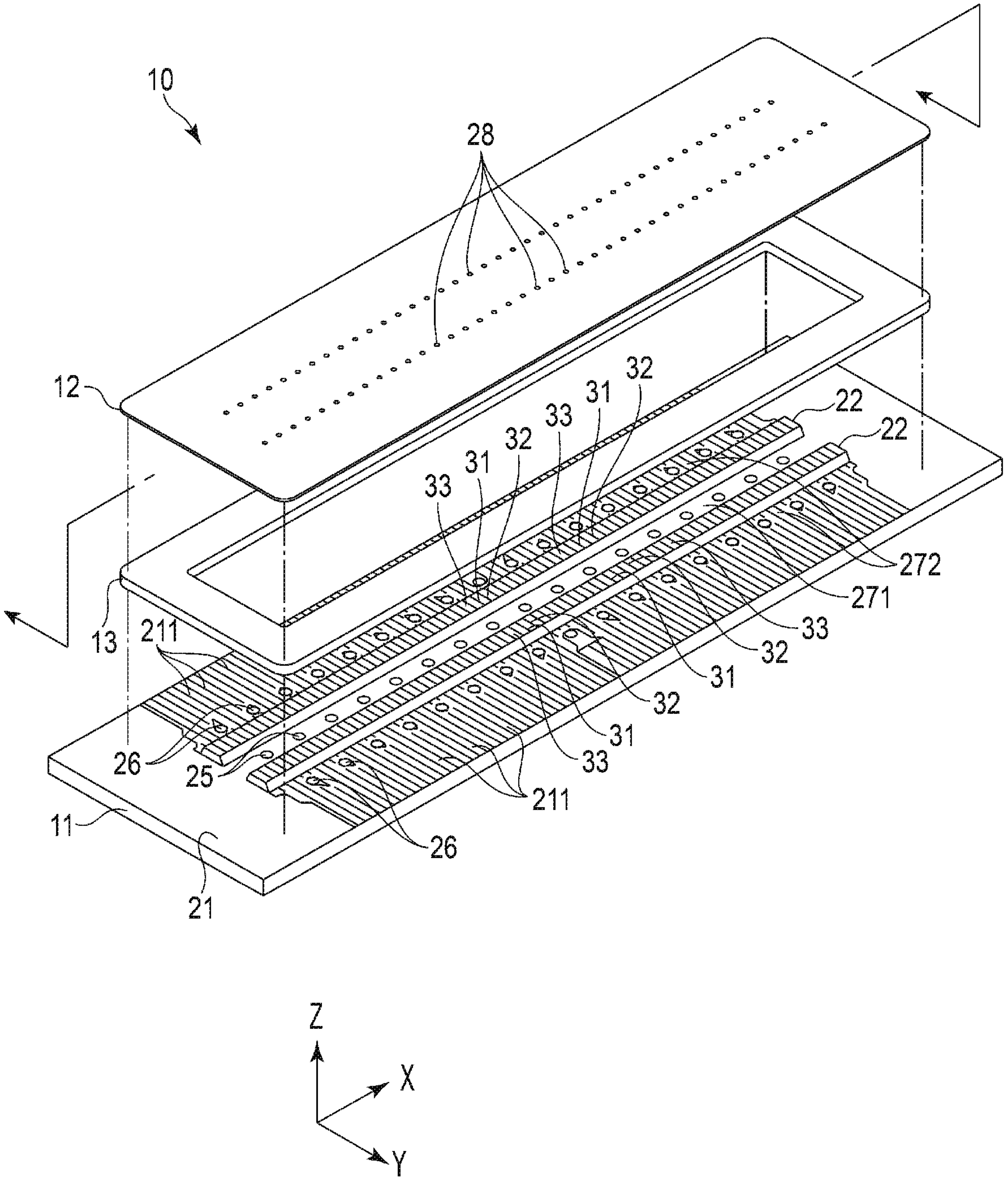
FIG. 2 depicts a partial configuration of an inkjet head in an exploded perspective view according to an embodiment.
Figure 3:
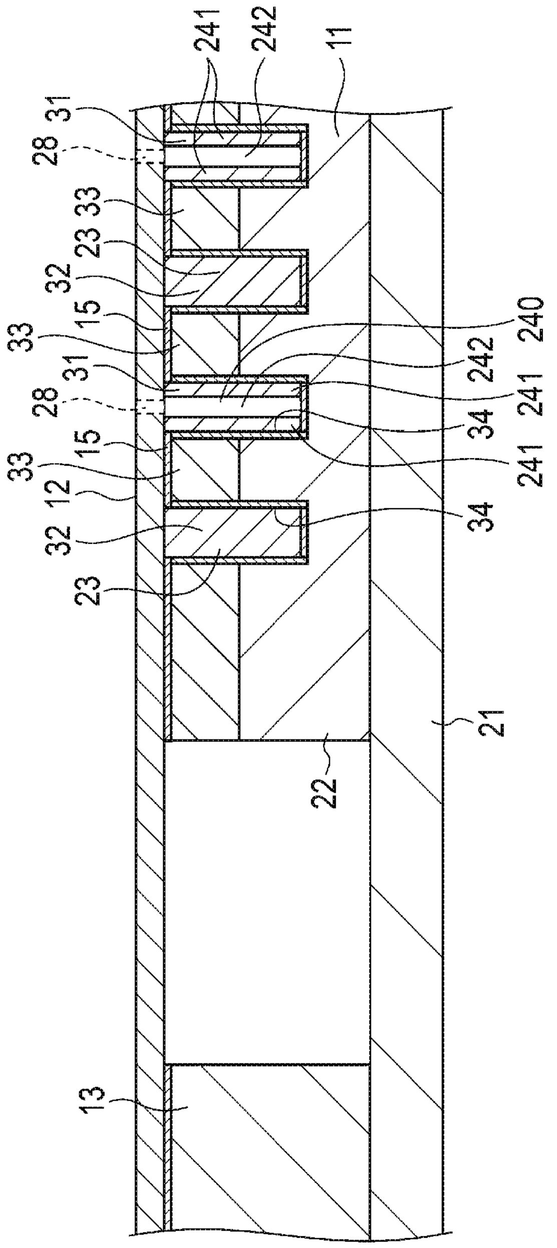
FIG. 3 depicts a partial configuration of an inkjet head in an enlarged cross-sectional view according to an embodiment.

As illustrated in FIG. 2, the actuator base 11 includes a substrate 21 and a pair of actuators 22.

The substrate 21 is formed of, for example, a ceramic, such as alumina, in a rectangular plate shape. The substrate 21 includes a flat mounting surface. The pair of actuators 22 are joined to the mounting surface of the substrate 21. A plurality of supply holes 25 and discharge holes 26 are provided to the substrate 21 alongside the actuators 22.

As illustrated in FIG. 2, patterned wirings 211 are provided to the substrate 21 of the actuator base 11. Each patterned wiring 211 is formed of, for example, a nickel thin film. The patterned wirings 211 have a common pattern or an individual pattern, and each is configured in a predetermined pattern shape connected to corresponding one of electrode layers 34 (see FIG. 4) formed in the actuators 22.

In a center portion of the substrate 21 between the pair of actuators 22, a row of the supply holes 25 is arranged in a direction parallel to a longitudinal direction (the first direction/X-axis in the drawing) of the actuators 22. The supply holes 25 communicate with an ink supply unit (not separately depicted) of the manifold 18. The supply holes 25 are connected to the ink tank through the ink supply unit. The supply holes 25 supply ink of the ink tank to the ink chamber 27.

The discharge holes 26 are provided in two parallel rows with the row of the supply holes 25 and the pair of actuators 22 running in the first direction therebetween. The discharge holes 26 communicate with an ink discharge unit (not separately depicted) of the manifold 18. The discharge holes 26 are connected to the ink tank through the ink discharge unit. The discharge holes 26 discharge ink of the ink chamber 27 to the ink tank.

The pair of actuators 22 are bonded to the mounting surface of the substrate 21. The pair of actuators 22 are provided to the substrate 21 in two parallel rows with the row of the supply holes 25 running in the first direction therebetween. Each of the actuators 22 is formed using two plate-shaped piezoelectric bodies formed of, for example, lead zirconate titanate (PZT). The two piezoelectric bodies are bonded so that polarization directions thereof are opposite to each other with respect to a thickness direction. The actuators 22 are bonded to the mounting surface of the substrate 21 using, for example, a thermosetting epoxy adhesive. The actuators 22 are arranged in parallel with each other to correspond to the nozzles 28 of the nozzle plate 12 arranged in two rows. The actuators 22 divide the ink chamber 27 into a first common chamber 271 where the supply holes 25 are formed and two second common chambers 272 where the discharge holes 26 are formed.

Each actuator 22 of the pair has a trapezoidal shape in cross-section. Side surface portions 221 of the actuator 22 are inclined in the second and third directions (along Y and Z-axes in the drawing) to form the cross-sectional trapezoidal shape. A bottom surface of the nozzle plate 12 is bonded to a top portion of the actuator 22. The actuator 22 includes a plurality of pressure chambers 31 and a plurality of dummy chambers 32 arranged alternately with each other. A plurality of side wall portions (may also referred to as side walls) 33 are provided partitioning the neighboring pressure and dummy chambers 31 and 32. The pressure and dummy chambers 31 and 32 each are formed by grooves (may also be referred to as chamber grooves or chamber-forming grooves) extending in the second direction (Y-axis) between the side wall portions 33. The side wall portions 33 function as drive elements between the chamber grooves to drive the pressure chambers 31.

A bottom surface portion of each of the chamber grooves is connected to a main surface of the substrate 21 through the inclined side surface portions 221. The pressure chambers 31 and the dummy chambers 32 are alternately arranged in the first direction (X-axis) that is the longitudinal direction of the actuators 22 and each extend in the second direction (Y-axis) perpendicular to the first rection (that is in the direction intersecting the longitudinal direction of the actuators 22).

The shape of the pressure chamber 31 may be different from that of the dummy chamber 32. The side wall portion 33 is formed between the pressure and dummy chambers 31 and 32 and is configured to deform in response to a drive signal to change a volume of each of the neighboring pressure chambers 31.

The plurality of pressure chambers 31 in the actuator 22 communicate with the plurality of corresponding nozzles 28 of the nozzle plate 12. Both ends of each pressure chamber 31 in the second direction (Y-axis) communicate with the ink chamber 27 (see for example FIG. 4). A first end portion of the pressure chamber 31 is open to the first common chamber 271 of the ink chamber 27, and a second end portion of the pressure chamber 31 is open to the second common chambers 272 of the ink chamber 27. Ink flows in from one end portion (one of the first and second end portions) of the pressure chamber 31 and flows out from another end portion (another of the first and second end portions) of the pressure chamber 31.

A throttle unit 240 is provided at each end portion of the pressure chamber 31. The throttle unit 240 is configured to create higher fluid resistance at the end portion of the pressure chamber 31 than that inside the pressure chamber 31.

The throttle unit 240 has a communication port through which the ink flows into or out of the pressure chamber 31. The communication port has a narrower opening than the inside of the pressure chamber 31. For example, at the end portion of the pressure chamber 31 in the second direction (Y-axis), the throttle unit 240 includes a pair of protrusion portions 241 that are formed on both side surfaces in the first direction (X-axis). The pair of protrusion portions 241 may be formed over the entire length or at part of the pressure chamber 31 in the third direction (Z-axis) that is a depth direction of the chamber-forming groove. Each protrusion portion 241 of the pair has a rectangular shape that is longer in the third direction (Z-axis).

The end portion of the chamber-forming groove is not completely covered or blocked with the pair of protrusion portions 241, and a throttle port 242 (through which the pressure chamber 31 communicates with the first common chamber 271 and the second common chambers 272) is formed between the pair of protrusion portions 241 at the end portion of the chamber-forming groove (or the pressure chamber 31). The throttle port 242 has a slit shape that extends in the third direction (Z-axis) that is the depth direction of the pressure chamber 31, and its opening formed between the pair of protrusion portions 241 has a width in the first direction (X-axis) less than that of the inside of the pressure chamber 31. The opening width of the throttle port 242 in the first direction is hence less than a cross-sectional area of an ink flow path in the pressure chamber 31. This configuration forms the throttle unit 240 having at least part of the communication port at each end in the second direction (Y-axis) being blocked with the protrusion portions 241 so that the fluid resistance or flow path resistance through the communication port increases.

The throttle unit 240 may be formed by forming a film of a photosensitive resin then subsequently exposing and developing the film or by forming a film of a photosensitive resin then subsequently exposing, developing, and processing (e.g., machining) a film beneath the photosensitive resin film. For example, the throttle unit 240 is formed in a predetermined shape by applying a photosensitive resin to each end portion (in the second direction or Y-axis) of the pressure chamber 31, curing target portions by exposure to light in an exposure process to form the pair of protrusion portions 241, and then washing away the unexposed resin with a developer solution to remove the unnecessary (and uncured) resin. Alternatively, the throttle port 242 may be formed by applying a photosensitive resin to the pressure chamber 31, curing the photosensitive resin at predetermined positions corresponding to the to-be-formed communication ports of the pressure chamber 31 by exposure and development processes, and performing machining, such as dicing.

An excess increase of fluid resistance of the throttle unit 240 may delay ink replenishment to the pressure chamber 31 after ink droplet ejection and prevent an increase in speed. Also, meniscus swelling varies depending on an ink viscosity, an ejection volume, a drive frequency, or the like. Therefore, the shape of the protrusion portion 241 and the dimension and/or position of the throttle port 242 of the throttle unit 240 are predetermined to achieve a desired or requested fluid resistance or flow path resistance corresponding to ink replenishment conditions and/or meniscus swelling characteristics.

An end of each of the dummy chambers 32 in the third direction (Z-axis) is blocked with the nozzle plate 12 that is joined to a top end portion of each dummy chamber 32. End portions of each dummy chamber 32 in the second direction (Y-axis) are blocked with cover units 23. One cover unit 23 is provided between the first common chamber 271 of the ink chamber 27 and one opening (serving as, for example, an entry) of the dummy chamber 32, and another cover unit 23 is provided between the second common chamber 272 and another opening (serving as, for example, an exit) of the dummy chamber 32. With the cover units 23, both end portions of the dummy chamber 32 are separated from the ink chamber 27. The dummy chamber 32 constitutes an air chamber into which ink does not flow.

The cover units 23 are formed by, for example, applying a photosensitive resin to both end portions of the dummy chamber 32 and curing the target portions. The protrusion portions 241 and the cover units 23 may be formed using, for example, the same photosensitive resin material simultaneously.

The electrode layer 34 (see FIG. 3) is provided to each of the pressure chambers 31 and the dummy chambers 32. The electrode layer 34 is formed of, for example, a nickel thin film. The electrode layer 34 extends from an inner surface portion of each of the chamber-forming grooves to the substrate 21 and is connected to the patterned wiring 211. The electrode layer 34 is formed on an inner wall of each chamber-forming groove. In one instance, the electrode layer 34 is formed to a side surface or a bottom surface of the side wall portion 33.

The nozzle plate 12 (see FIG. 2) is formed of, for example, a polyimide rectangular film. The nozzle plate 12 faces a mounting surface of the actuator base 11. The plurality of nozzles 28 penetrate the nozzle plate 12 in the thickness direction (the third direction/Z-axis).

Figure 4:
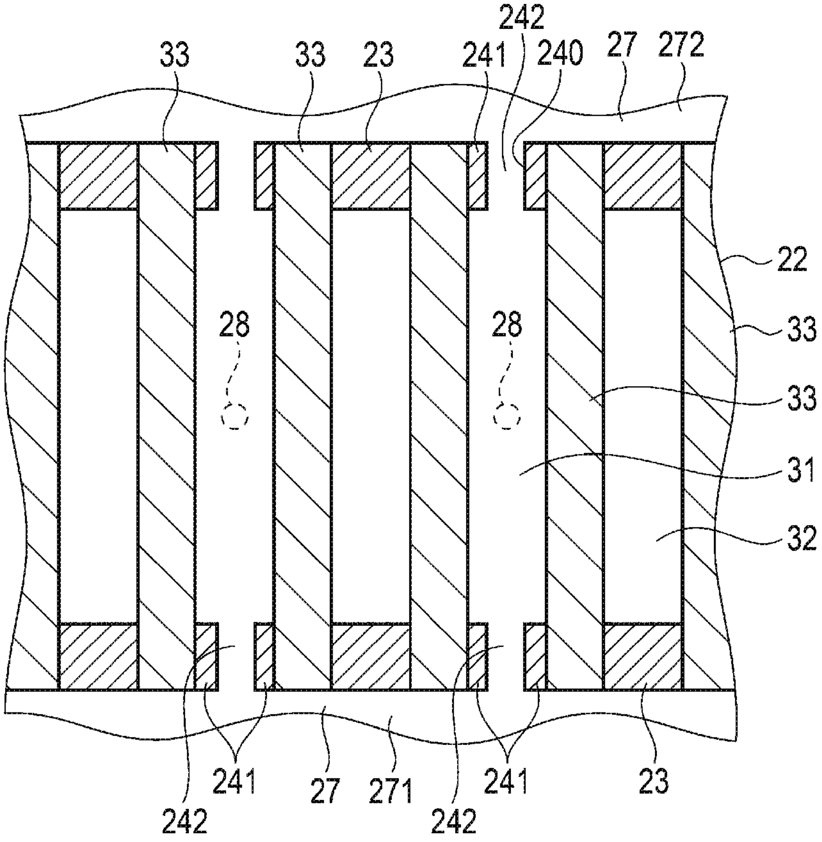
FIG. 4 depicts a partial configuration of an inkjet head in an enlarged cross-sectional view according to an embodiment.

The number of the nozzles 28 is the same as that of the pressure chambers 31, and each nozzle 28 faces the corresponding pressure chamber 31. As shown in FIG. 2, the nozzles 28 are arranged in two rows each running in the first direction (X-axis) and corresponding to the pair of actuators 22 in the second direction (Y-axis). Each nozzle 28 has a cylindrical shape with its axis extending in the third direction (Z-axis). The nozzle 28 may have a diameter of the cylindrical shape either being constant or decreasing toward its center portion or front end portion. The plurality of nozzles 28 are provided to face each other at intermediate portions in a direction in which the pressure chambers 31 formed in the pair of actuators 22 extend and communicate with the respective pressure chambers 31. As shown in FIG. 4, each nozzle 28 is arranged at a position corresponding toa center portion in the longitudinal direction (the 2nd direction/Y-axis) of the pressure chamber 31 of the actuator 22 underneath the nozzle plate 12.

The frame 13 is formed of, for example, a nickel alloy in a rectangular frame shape. As shown in FIG. 2, the frame 13 is interposed between the mounting surface of the actuator base 11 and a bottom or back surface (when viewed as in the drawing) of the nozzle plate 12. The frame 13 is bonded to the actuator base 11 and the nozzle plate 12. The nozzle plate 12 is attached to the actuator base 11 with the frame 13 therebetween.

As shown in FIG. 1, the manifold 18 is joined to the actuator base 11 on a side opposite to the nozzle plate 12 (that is, on a surface not facing the nozzle plate 12). The manifold 18 includes the ink supply unit and the ink discharge unit configured to form ink flow paths that communicate with the supply holes 25 and the discharge holes 26 (see FIG. 2), respectively.

The circuit board 17 is, for example, a film carrier package (FCP). As shown in FIG. 1, the circuit board 17 includes a resin film 51 and one or more integrated circuits (ICs) 52. The resin film 51 is a flexible film. A plurality of wirings are formed to the resin film 51. Each IC 52 is connected to the wirings of the resin film 51. The IC 52 is electrically connected to the electrode layers 34 through the wirings of the resin film 51 and the patterned wiring 211.

The ink chamber 27 formed in the inkjet head 10 is surrounded by the actuator base 11, the nozzle plate 12, and the frame 13. The ink chamber 27 is arranged between the actuator base 11 and the nozzle plate 12. In the present embodiment, for example, the ink chamber 27 is partitioned into three sections in the second direction (Y-axis) by the two actuators 22. The three sections include the first common chamber 271 and the two second common chambers 272. The first common chamber 271 is a common chamber where the supply holes 25 are provided. The second common chambers 271 are common chambers where the discharge holes 26 are provided. The first and second common chambers 271 and 272 communicate with the pressure chambers 31.

In the inkjet head 10 of the present embodiment, ink circulates between the ink tank and the ink chamber 27 through the supply holes 25, the pressure chambers 31, and the discharge holes 26. In a case where the inkjet head 10 is installed in an inkjet printer, for example, based on a signal input from a control unit of the inkjet printer, the IC 52 functioning as a drive IC chip applies a drive voltage (may also be referred to as a first drive voltage) to the electrode layers 34 of the pressure chambers 31 through the wirings of the film 51. A potential difference is generated between the electrode layers 34 of the pressure chambers 31 to which the drive voltage has been applied and the electrode layers 34 of the dummy chambers 32 to which the drive voltage has not been applied, and the side wall portions 33 are selectively deformed in the shear mode. The deformation of the side wall portions 33 in response to the drive signal causes the volume of each of the pressure chambers 31 neighboring the deformed side wall portions 33 to change.

The shear-mode deformation of the side wall portions 33 increases the volume of the pressure chambers 31, which in turn decreases the pressure inside the pressure chambers 31. As a result, ink of the ink chamber 27 flows into the respective pressure chambers 31.

While the pressure chambers 31 are in the state of volume increase, the IC 52 applies another drive voltage (may also be referred to as a second drive voltage) having an opposite potential to that of the first drive voltage to the electrode layers 34 of the volume-increased pressure chambers 31. This deforms the side wall portions 33 in the shear mode, causing both a volume decrease and a pressure increase of the pressure chambers 31. As a result, the ink inside the pressure chambers 31 is compressed and ejected from the nozzles 28 that communicate with the pressure chambers 31.

A method of manufacturing the ink jet head 10 according to the present embodiment will be described. First, a piezoelectric member that forms a plurality of chamber-forming grooves is attached to the plate-shaped substrate 21 using an adhesive or the like, and a machining process, such as dicing, is performed using a dicing saw, a slicer, or the like to form the actuator base 11 having a predetermined external shape. Alternatively, for example, a block-shaped base member having a thickness corresponding to a total size of multiple plates of to-be-formed actuator bases 11 is first prepared, and then the block-shaped base member is divided or sliced into the multiple plates of the actuator bases 11 each having a predetermined shape.

Next, the electrode layers 34 and the patterned wirings 211 are formed on an inner surface of each of the chamber-forming grooves and on the surface of the substrate 21. As a result, the electrode layer 34 and the patterned wirings 211 are formed at predetermined positions on the surface of the actuator base 11.

Figure 5:
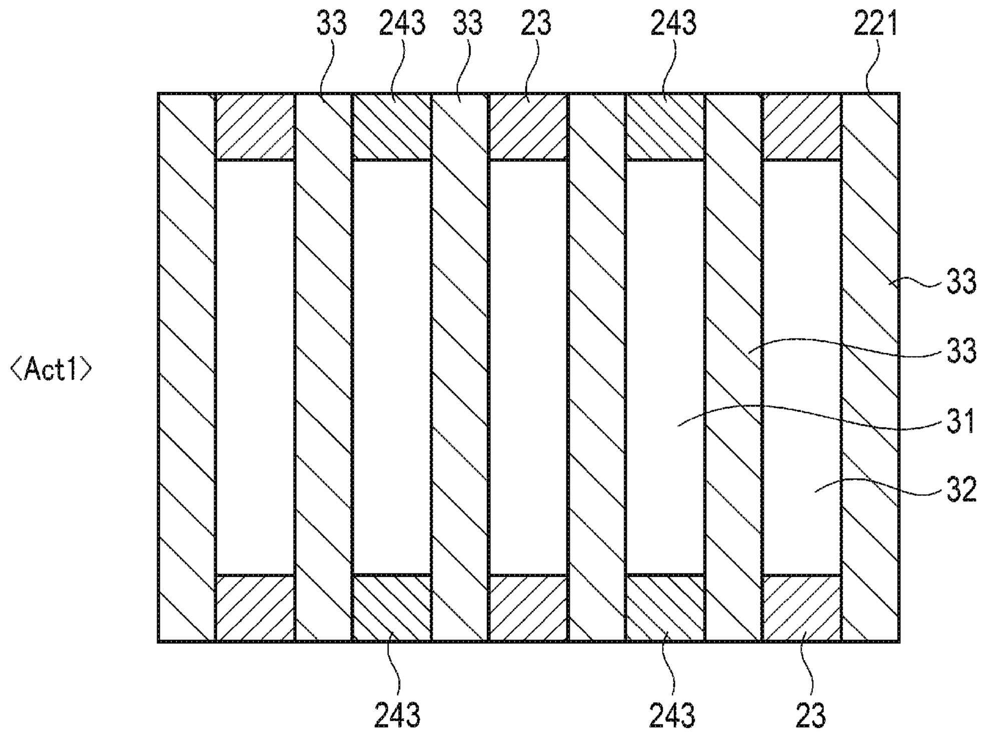
FIG. 5 is a diagram of a method of manufacturing an inkjet head according to an embodiment.
Figure 5:
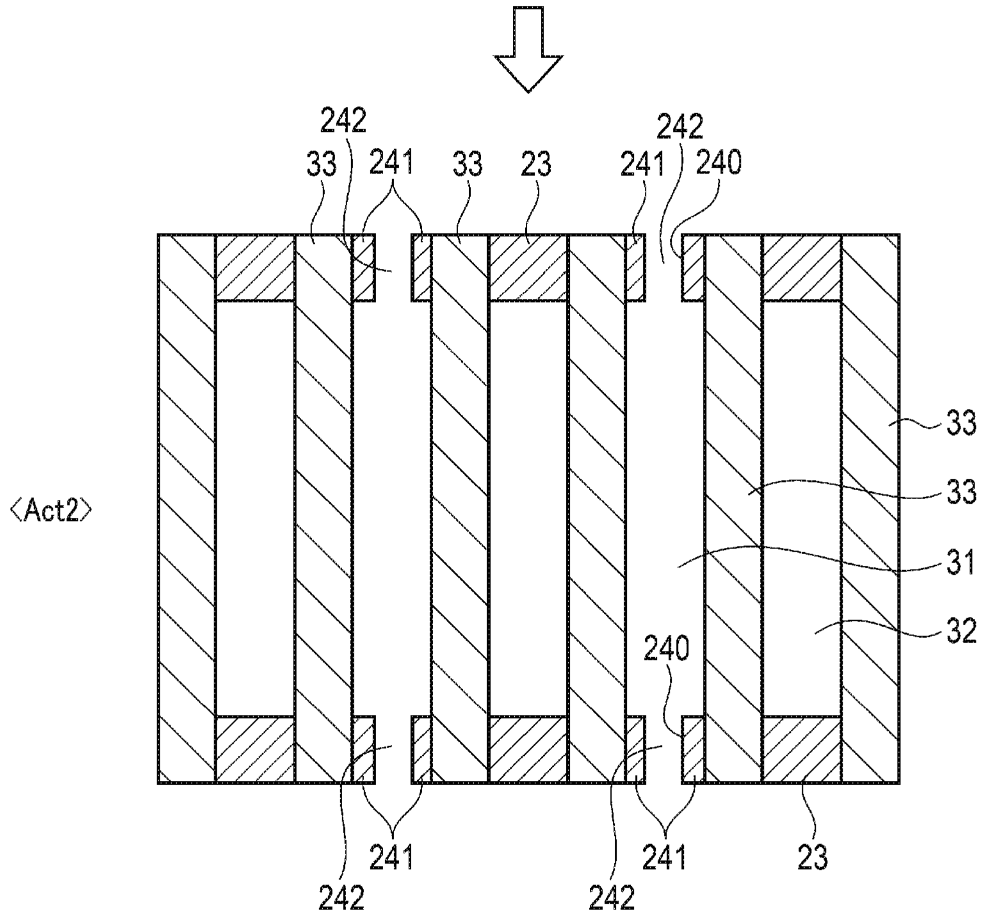

Subsequently, as illustrated in FIG. 5, the protrusion portions 241 and the cover units 23 are formed using the photosensitive resin material 243 simultaneously. For example, the communication ports at the end portions of each of the grooves that form the pressure and dummy chambers 31 and 32 are filled and blocked with a photosensitive resin material 243 (Act 1: Filling Process). The photosensitive resin material 243 is then formed into a predetermined shape (Act 2: Forming Process). As one example of the shape forming process, the photosensitive resin material 243 filled in the communication ports of the chamber-forming grooves is exposed with an exposure mask having an exposure pattern formed thereon in such a manner that a target portion to form an opening of the throttle port 242 is not cured while portions other than the non-cured target portion are cured. The non-cured portions are then washed away with a developer, achieving the predetermined shape of the throttle port 242 having the opening between the pair of protrusion portions 241 at each end portion (or each communication port) of each of the pressure chamber forming grooves. This way, the protrusion portions 241 and the cover units 23 are simultaneously formed for the pressure chambers 31 and the dummy chambers 32, respectively, and the throttle units 240 are provided to the respective end portions of each of the pressure chambers 31.

As another example, if a sufficient resolution cannot be obtained by using the exposure process, the throttle port 242 may be formed by a machining process to form the protrusion portions 241. For example, as illustrated in FIG. 5, in the filling process (Act 1), the photosensitive resin material 243 is filled into both end portions of the pressure and dummy chambers 31 and 32. The photosensitive resin material 243 is then cured by an exposure process, and unexposed portions are removed in a development process. In this processing, the communication ports of the pressure and dummy chambers 31 and 32 may be entirely blocked with the walls of the cured photosensitive resin. Next, in the forming process (Act 2), the throttle port 242 is formed by machining using a dicer to remove portions of the cured photosensitive resin. The dicing may be done with a blade (or the like) having the desired width to achieve a target resolution for the opening through the throttle port 242. As a result, the protrusion portions 241 and the cover units 23 having a predetermined shape can be formed.

The actuator base 11 is then assembled with the manifold 18, and the frame 13 is bonded to one surface of the substrate 21 of the actuator base 11 using an adhesive sheet of a thermoplastic resin or the like.

The assembled frame 13, the top portions 222 of the side wall portions 33 of the actuator 22, and the surfaces of the protrusion portions 241 that face the nozzle plate 12 are polished to flush with each other. The top portions 222 of the side wall portions 33, the frame 13, and the facing surfaces of the protrusion portions 241 that have been polished are bonded and attached to the nozzle plate 12. The nozzles 28 of the nozzle plate 12 are positioned to face the respective pressure chambers 31.

Lastly, by connecting the IC 52 and the circuit board 17 to the patterned wirings 211 formed on the main surface of the substrate 21 through a flexible printed circuit board as illustrated in FIG. 1, the inkjet head 10 is completed.

An example of an inkjet printer 100 including the inkjet head 10 according to an embodiment will be described with reference to FIG. 15. The inkjet printer 100 includes a housing 111, a medium supply unit 112, an image forming unit 113, a medium discharge unit 114, a conveyance device 115, and a control unit 116.

The inkjet printer 100 is one example of a liquid ejection device that performs an image forming process on, for example, a sheet of paper P as a recording medium that is an ejection target by ejecting thereto liquid, such as ink, while conveying the paper P along a predetermined conveyance path A from the medium supply unit 112 to the medium discharge unit 114 through the image forming unit 113.

The housing 111 defines an outline of the inkjet printer 100. A discharge port through which paper P after the image forming process is discharged outside the housing 111 is provided at a predetermined position of the housing 111.

The medium supply unit 112 includes a plurality of paper feed cassettes and is configured to hold a plurality of sheets of paper P prior to the image forming process. The sheets of paper P may have various sizes and are stacked on each other in the paper feed cassettes according to the sizes.

The medium discharge unit 114 includes a paper discharge tray configured to hold paper P that has been discharged through the discharge port.

The image forming unit 113 includes a support unit 117 that supports paper P during the image forming process and a plurality of head units 130 that are provided above the support unit 117 to face the paper P supported on the support unit 117.

The support unit 117 includes a conveyance belt 118 provided in a loop shape in a predetermined region for image formation on paper P, a support plate 119 that supports the conveyance belt 118 from its back side, and a plurality of belt rollers 120 provided on the back side of the conveyance belt 118.

Figure 15:
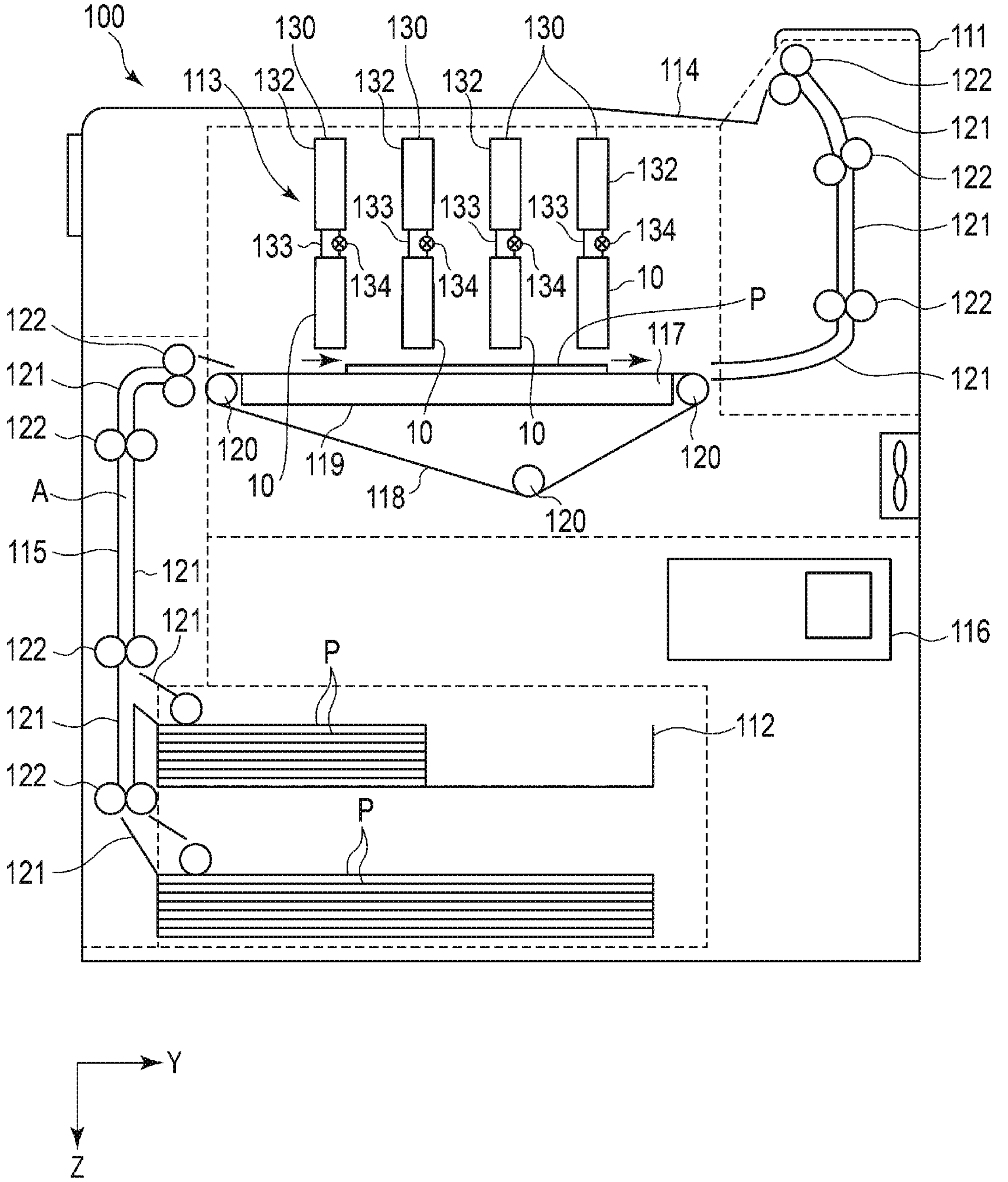
FIG. 15 is a schematic diagram of an inkjet printer according to an embodiment.

During the image formation process, the support unit 117 supports a sheet of paper P on its paper holding surface, which is an upper surface of the conveyance belt 118, and conveys the paper P downstream as indicated by an arrow in FIG. 15 by rotating the belt rollers 120 and sending the conveyance belt 118 foreword at a predetermined timing.

In the present embodiment, there are four head units 130 in the image forming unit 113 for ejecting four colors of ink. Each head unit 130 designated for one color includes an ink tank 132, a connection flow path 133, a circulation pump 134, and the inkjet head 10.

An ink tank 132 is mounted on the inkjet head 10 and holds ink therein. The connection flow path 133 is provided between the ink tank 132 and the inkjet head 10 and connects the ink tank 132 to the inkjet head 10. The circulation pump 134 is a circulation unit that operates to move ink along the flow path 133.

In this example, the head unit 130 is of a circulation type that constantly circulates the liquid (ink) from the ink tank 132 to the pressure chambers 31, the dummy chambers 32, and the ink chamber 27 in the inkjet head 10 and back.

In the present embodiment, four head units 130 (each with a corresponding inkjet 10) are provided for four colors (cyan, magenta, yellow, and black). A respective ink tank 132 is provided for each of the different color inks. The number of head units 130 (and colors) is not limited to the four of the present embodiment. Each ink tank 132 is connected to a corresponding ink jet head 10 through a connection flow path 133. The connection flow path 133 includes a supply flow path connected to an ink supply port of the inkjet head 10, and a collection flow path connected to an ink discharge port of the inkjet head 10.

A negative pressure control device, such as a pump, can also be connected to the ink tank 132. The negative pressure control device controls an internal pressure of the ink tank 132 to a negative pressure according to a water head difference between the inkjet head 10 and the ink tank 132 so that the ink supplied to each of the nozzles 28 of the inkjet head 10 is formed into a meniscus having a predetermined shape.

The circulation pump 134 is, for example, a liquid feeding pump including a piezoelectric pump. The circulation pump 134 is provided in the supply flow path of the connection flow path 133. The circulation pump 134 is connected to a drive circuit of the control unit 116 through a wiring and controlled by a central processing unit (CPU). The circulation pump 134 circulates liquid in a circulation flow path including the inkjet head 10 and the ink tank 132.

The conveyance device 115 conveys paper P along the conveyance path A from the medium supply unit 112 to the medium discharge unit 114 through the image forming unit 113. The conveyance device 115 includes a plurality of guide plate pairs 121 disposed along the conveyance path A and a plurality of conveyance rollers 122.

Each of the guide plate pairs 121 includes a pair of plate members arranged to face each other sandwiching paper P therebetween and guides the paper P along the conveyance path A.

The conveyance rollers 122 are driven to rotate by the control unit 116 so that paper P between the plate members of the guide plate pairs 121 is conveyed downstream along the conveyance path A. Sensors that detect a conveyance status of paper P are provided at predetermined positions of the conveyance path A.

The control unit 116 includes a control circuit as a controller, such as a CPU, a read only memory (ROM) that stores various programs or the like; a random-access memory (RAM) that temporarily stores various variable data and image data, and an interface unit that receives and outputs data from and to an external device.

In the inkjet printer 100 according to the present embodiment, for example, upon detection of a print instruction entered by a user who operates an operation input unit of an operation interface provided to the inkjet printer 100, the control unit 116 drives the conveyance device 115 to convey a sheet of paper P along the conveyance path A and outputs one or more print signals to the respective head units 130 at a predetermined timing to drive the inkjet heads 10. As part of ink ejection operation, each of the inkjet heads 10 sends a drive signal to the IC 52 in response to an image signal corresponding to the image data temporarily stored in the RAM, applies a drive voltage to the electrode layers 34 of the pressure chambers 31 via the wirings, selectively drive the side wall portions 33 of the actuators 22, ejects ink from the nozzles 28, and forms an image on the paper P held on the conveyance belt 118.

Alsop, as part of the ink ejection operation, the control unit 116 drives the circulation pump 134 of each of the inkjet head 10 to circulate the ink in the circulation flow path that passes through the ink tank 132 and the inkjet head 10. By this circulation operation, the circulation pump 134 is driven to supply the ink in the ink tank 132 from the supply holes 25 to the first common chamber 271 of the ink chamber 27 through the ink supply unit of the manifold 18. The ink is supplied to both the pressure chambers 31 and the dummy chambers 32 of the pair of actuators 22. The ink flows into the second common chambers 272 of the ink chamber 27 through the pressure chambers 31 and the dummy chambers 32. The ink is discharged from the discharge holes 26 to the ink tank 132 through the ink discharge unit of the manifold 18.

The embodiment can provide a liquid ejecting head capable of ensuring stable ejection characteristics and a method of manufacturing the liquid ejecting head. The inkjet head 10 of the present embodiment includes the throttle units 240 at the end portions of each of the pressure chambers 31 in the actuators 22 and makes the flow path resistance at the end portions that function as the ink entry and exit higher than the flow path resistance inside the pressure chamber 31 and the first and second common chambers 271 and 272. As a specific example, the cross-sectional area of the ink flow path of the opening portion that is formed in the first common chamber 271 or the second common chambers 272 as the common chambers of the pressure chambers 31 is less than the cross-sectional area of the flow path of each of the pressure chambers 31. This reduces swelling of the ink meniscus formed at each of the nozzles 28 corresponding to the respective pressure chambers 31 during ink ejection and makes return of the ink meniscus quicker. Hence, the influence of meniscus swelling on ejection of the next ink droplet is reduced, and the ejection stability can be improved.

Figure 6:
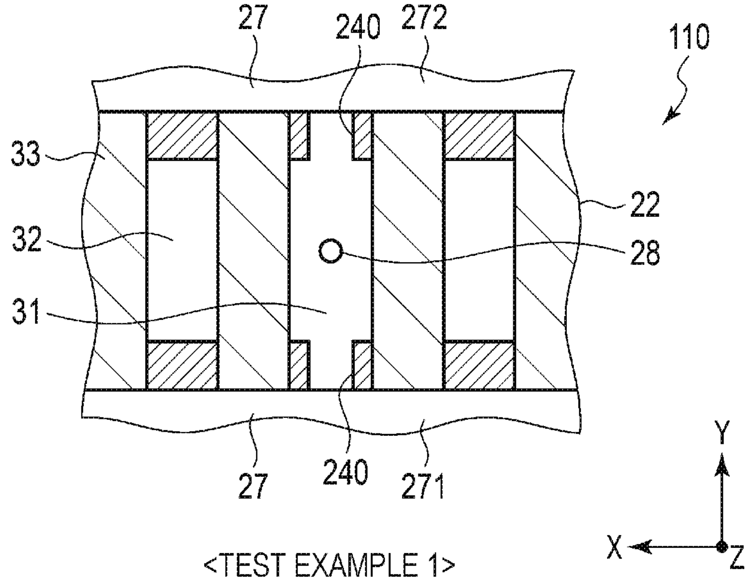
FIG. 6 is a diagram of an inkjet heads according to certain Test Examples.
Figure 6:
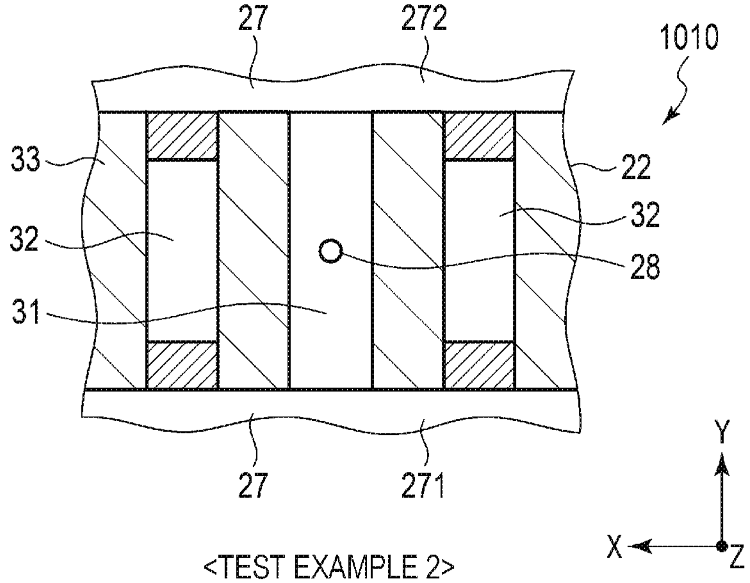
Figure 7:
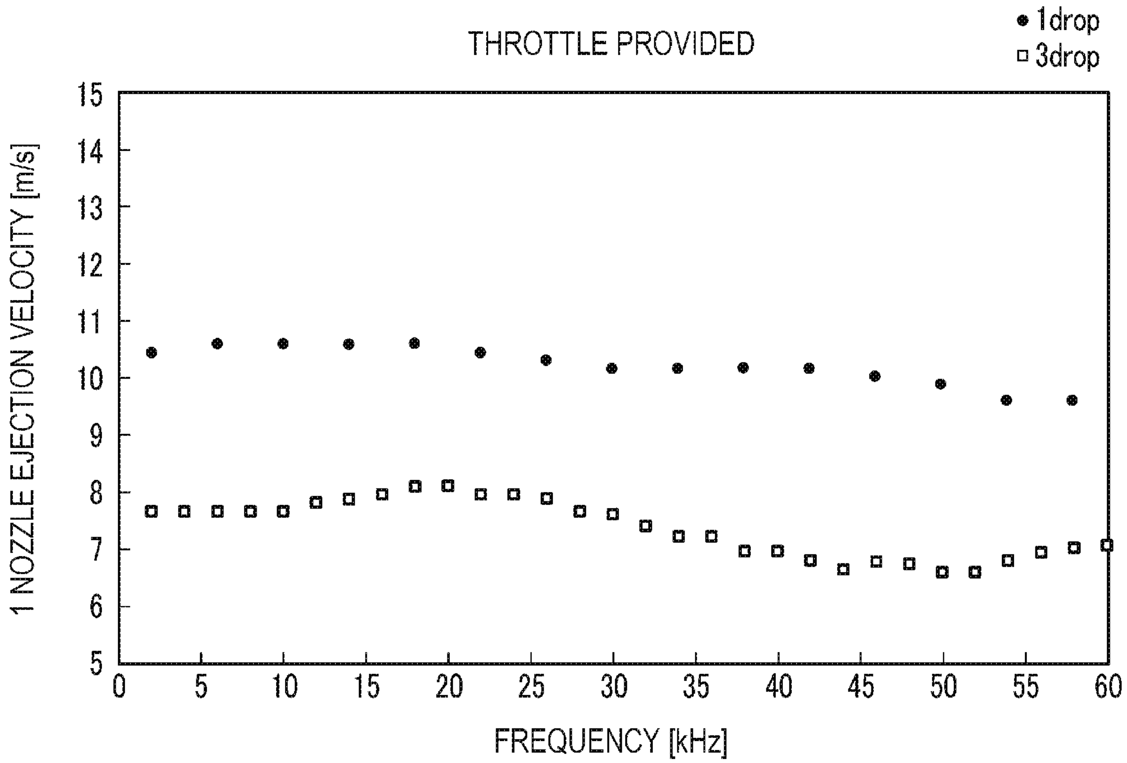
FIG. 7 is a graph of an ejection velocity of an inkjet head according to one Test Example.
Figure 8:
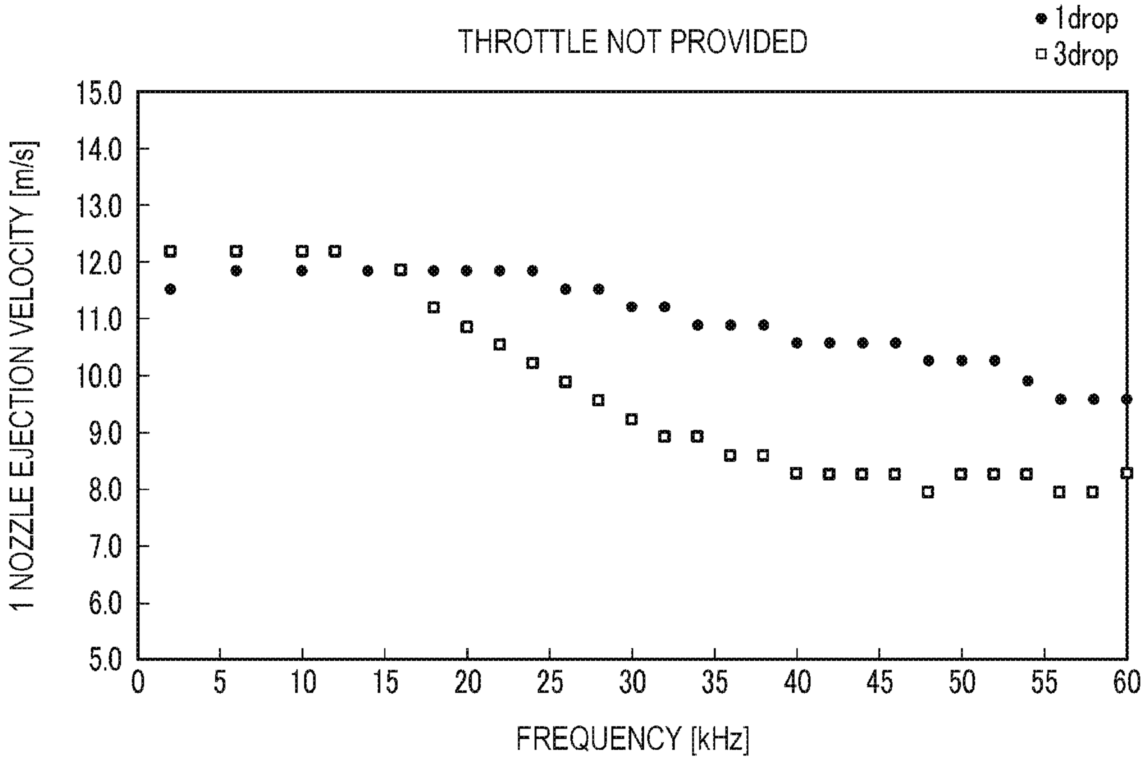
FIG. 8 is a graph of an ejection velocity of an inkjet head according to another Test Example.

FIG. 6 illustrates a Test Example 1 of an ink jet head 110 in which a throttle (throttle unit 240) is provided and Test Example 2 of an ink jet head 1010 in which a throttle is not provided. FIG. 7 illustrates frequency characteristics of the ink jet head 110 according to Test Example 1 (throttle is provided), and FIG. 8 illustrates frequency characteristics of the ink jet head 1010 according to Test Example 2 (throttle is not provided). FIGS. 7 and 8 both illustrate a relationship between an ejection velocity of a nozzle and a driving frequency in the case of 1 drop ejection and 3 drop ejection.

The inkjet head 110 according to Test Example 1 is a side shooter type in which each end of the pressure chamber 31 in the second direction (Y-axis in the drawing, which is the chamber extending direction) communicate respectively with the first and second common chambers 271 and 272, and the nozzle 28 is formed in the intermediate portion of the pressure chamber 31 along the second direction. The difference between the two inkjet heads 110 and 1010 (Test Example 2) is whether the throttle unit 240 is provided or not.

As illustrated in FIG. 8, in the inkjet head 1010 according to Test Example 2, the ejection velocity in a low frequency band is flat. However, as the frequency increases, the ejection velocity tends to decrease, and there is a difference in ejection velocity between a low frequency band and a high frequency band. In the case of 1 drop ejection by the inkjet head 1010, the ejection velocity is flat up to 25 kHz. However, at 25 kHz or higher, the ejection velocity tends to decrease as the frequency increases. In the case of 3 drop ejection by the inkjet head 1010, the ejection velocity is flat up to 15 kHz. However, at 15 kHz or higher, the ejection velocity tends to decrease as the frequency increases. Accordingly, the landing position of an ejected ink droplet varies noticeably depending on printing patterns. If there is a difference in ejection velocity, a longer period of time is required to reduce meniscus swelling, which causes deterioration in printing quality and prevents high-speed driving.

On the other hand, as illustrated in FIG. 7, in the inkjet head 110 including the throttle unit 240 according to Test Example 1, the ejection velocities of both the 1 drop case and the 3 drop case tend to be relatively flat (unchanging). This is because the fluid resistance from the first and second common liquid chambers 271 and 272 to the nozzle 28 increases and the meniscus swelling of the meniscus is reduced.

Figure 9:
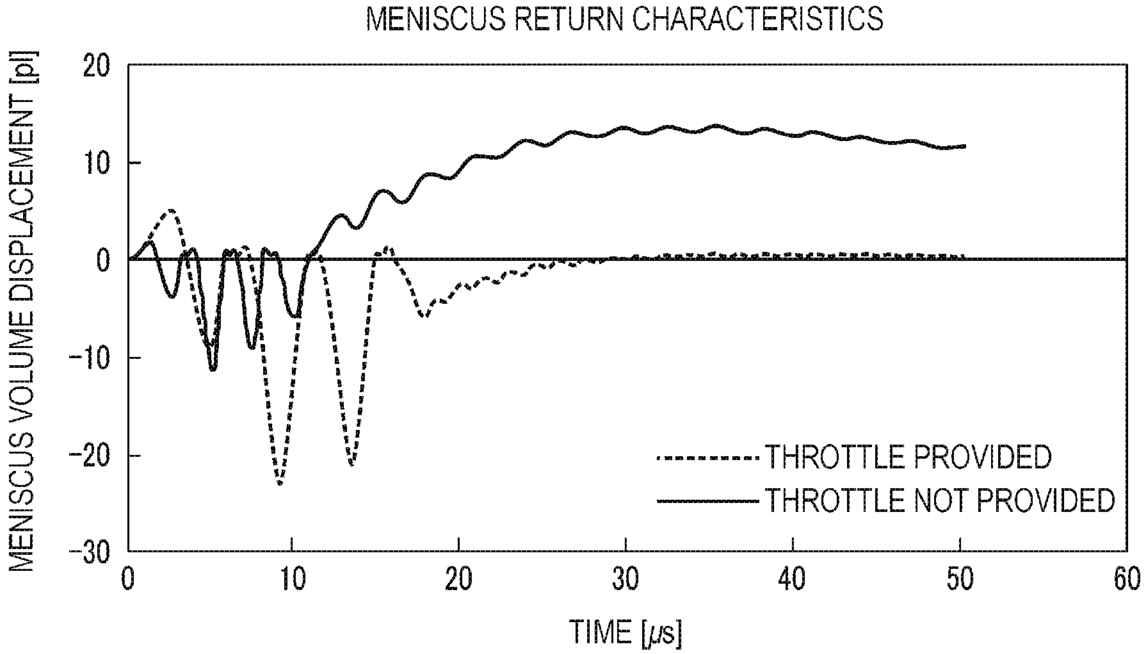
FIG. 9 is a graph of meniscus return characteristics of inkjet heads according to certain Test Examples.

FIG. 9 illustrates simulation results of meniscus return time for Test Example 1 and Test Example 2. FIG. 9 shows the meniscus state of the nozzle 28 in a low frequency band in which there is a sufficient period of time from ejection of an ink droplet before ejection of the next ink droplet, and the ejection in a stable state after waiting for the return of the meniscus can be achieved whether or not the throttle unit 240 is provided. On the other hand, in a high frequency band, the period of time from the first droplet ejection to the next droplet ejection is shorter, and thus the next droplet ejection starts before the complete return of the meniscus. Therefore, in the inkjet head 1010 that does not have the throttle unit 240, since the meniscus swelling becomes significant after the first droplet ejection, the meniscus return cannot be achieved prior to the next droplet ejection, and the ejection velocity decreases. On the other hand, in the inkjet head 110 that has the throttle unit 240, since the meniscus swelling is effectively reduced, the meniscus return becomes quicker, and the influences of the meniscus on the next droplet ejection can be suppressed or mitigated. Accordingly, it can be said from the results of the simulation that the ejection stability of the inkjet head 110 can be improved by providing the throttle between the pressure chambers 31 and the common chamber.

Figure 10:
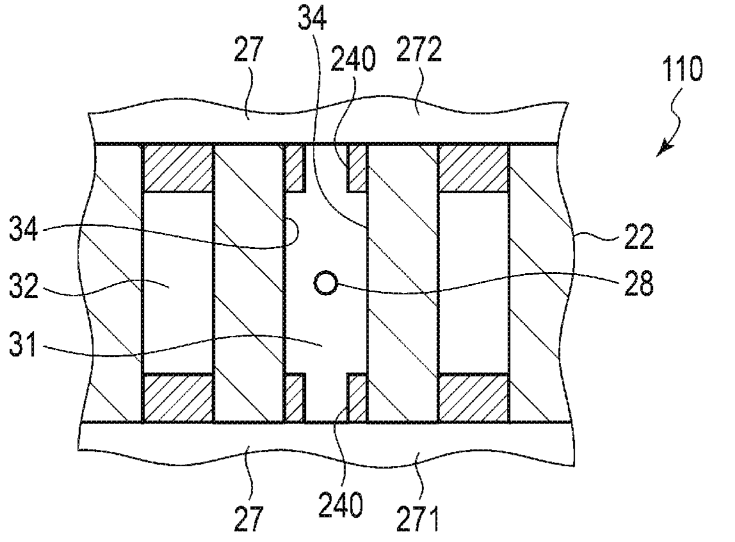
FIG. 10 is a diagram illustrating end shooter type inkjet heads according to certain Test Examples.
Figure 10:
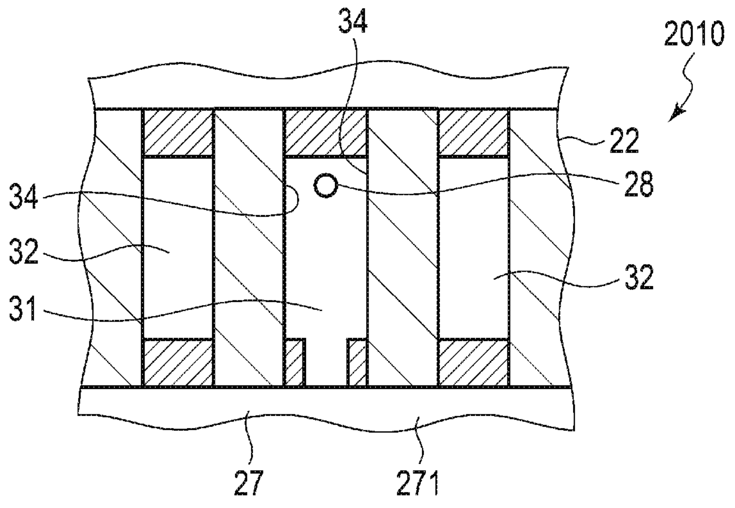

FIG. 10 is a diagram illustrating a side shooter type ink jet head 110 according to Test Example 1 and a shared wall type end shooter type ink jet head 2010 of a shear-mode shared wall type with an end shooter design (herein may also be referred to as an end shooter type) according to Test Example 3 where the ink entrance to the pressure chamber 31 is formed at one end and the nozzle 28 is formed at an opposite end.

Figure 11:
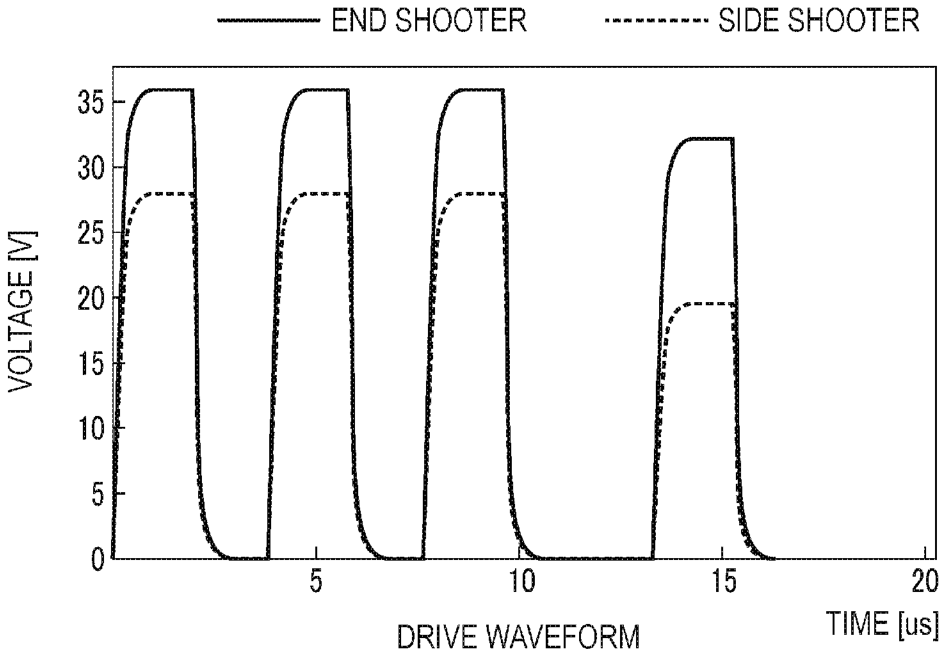
FIG. 11 is a graph illustrating drive waveforms of certain inkjet head types.
Figure 12:
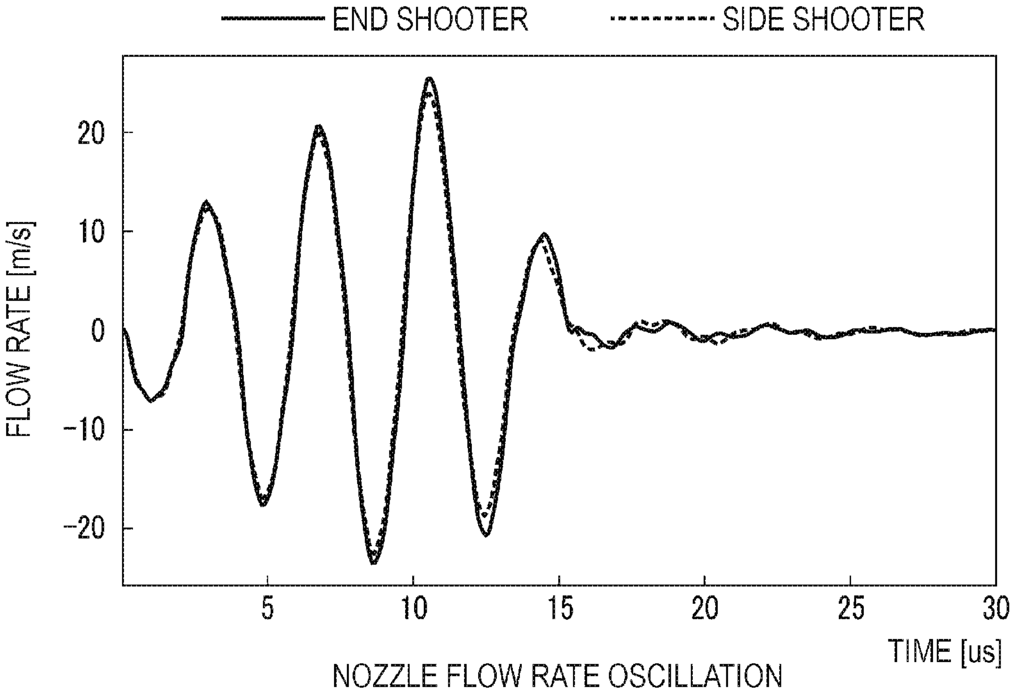
FIG. 12 is a graph illustrating nozzle flow rate oscillations of certain inkjet head types.
Figure 13:
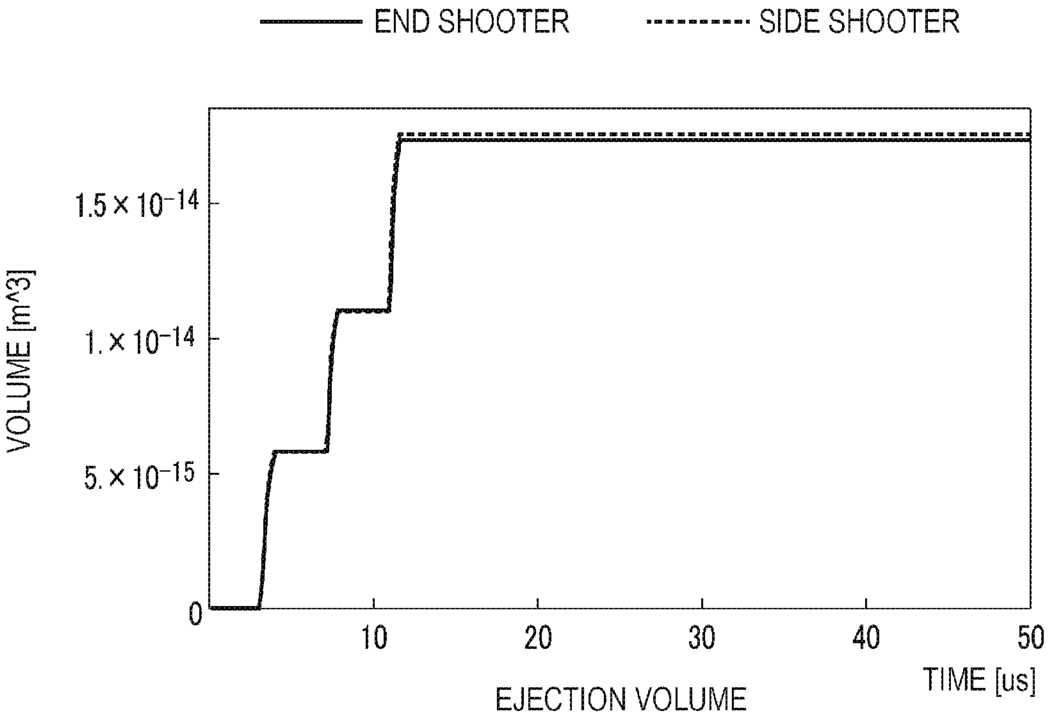
FIG. 13 is a graph of ejection volumes of certain inkjet heads.
Figure 14:
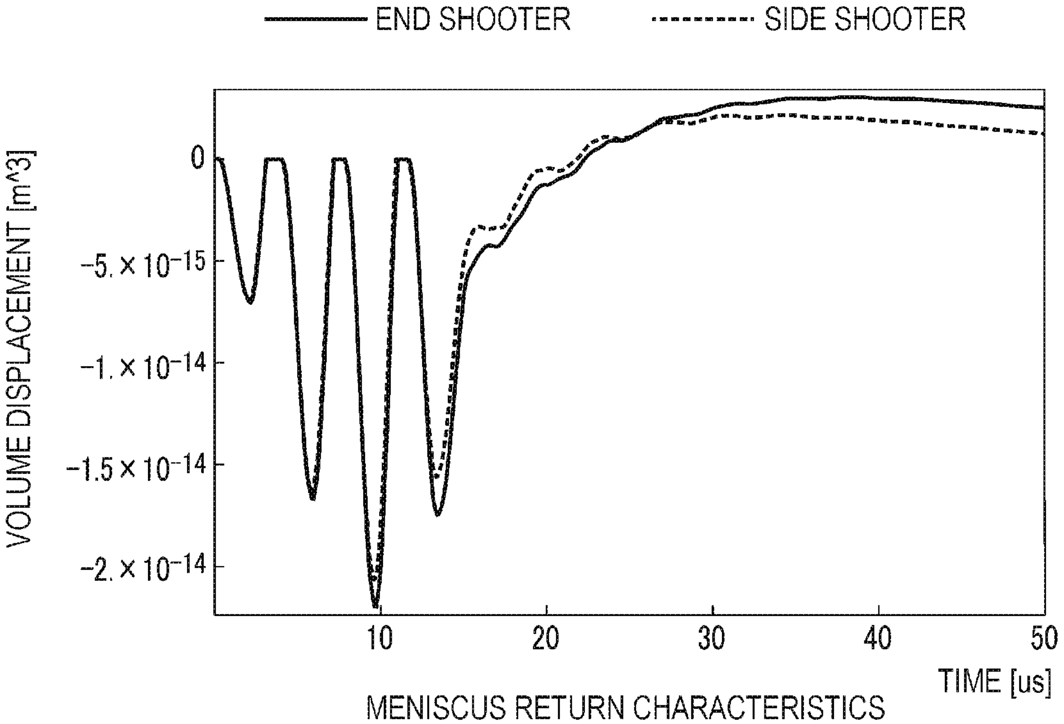
FIG. 14 is a graph of meniscus return characteristics of certain ink jet heads.

FIGS. 11 to 14 illustrate a comparison between simulated characteristics if the throttle is provided in the end shooter type ink jet head 2010 (Test Example 3) and the side shooter type ink jet head 110 (Test Example 1). FIG. 11 illustrates the drive waveforms for these test examples. FIG. 12 illustrates the nozzle flow rate oscillations for these test examples. FIG. 13 illustrates the ejection volumes for these test examples. FIG. 14 illustrates the meniscus return characteristics for these test examples.

The end shooter type inkjet head 2010 (Test Example 3) is an end shooter type where one end portion of the pressure chamber 31 communicates with the first common chamber 271 and another end portion (that is the end portion of the ink flow path) of the pressure chamber is closed so that the nozzle 28 are formed proximate to the end of the flow path. The end shooter type inkjet head 2010 thus forms the flow path of ink from only one side to the nozzle 28, whereas the side shooter type inkjet head 110 permits ink to flow to the nozzle 28 from two different directions.

Comparing the simulation results of Test Examples 1 and 3 under the same conditions including the ejection volume, the nozzle flow rate oscillation, and the meniscus return characteristics, the drive voltage in the side shooter type inkjet head 110 (Test Example 1) is lower than that of the end shooter type inkjet head 2010 (Text Example 3). Therefore, supplying ink from both sides of the pressure chamber 31 is superior to supplying ink from only one side of the pressure chamber 31 from the viewpoint of drive efficiency. That is, the side shooter type inkjet head 110 where the nozzle 28 is provided at the center of the pressure chamber 31 and the entrance for ink is provided at both ends of the pressure chamber 31 has higher ejection efficiency than the end shooter type inkjet head 2010.

In general, since the shear-mode shared wall type inkjet head has a plurality of pressure chambers configured with fine grooves that are formed in a piezoelectric body using a diamond cutter blade, it is difficult to reduce a cross-sectional area of just one part of each pressure chamber. However, in the present embodiment, since the throttle units 240 of the respective pressure chamber 31 are formed by filling photosensitive resin into the previously formed grooves of the actuators 22 and then patterning the photosensitive resin by an exposure process, the number of manufacturing steps can be reduced, and the throttle units 240 or throttle structure that increases the fluid resistance can be formed more simply and at a low cost. Furthermore, since a shape of a hole or an opening can be selected relatively freely in the exposure and development processing, the fluid resistance provided by the throttle structure can also be more easily and freely designed. In addition, in the present embodiment, the side surface portion 221 of the actuator 22 has an inclined surface. As a result, there is little restriction on exposure direction, and the exposure and development process can be simpler. In addition, by performing machining in combination with such processing, finer patterning can be implemented with high accuracy.

In the inkjet head 10 according to the present embodiment, the throttle is partially formed in the communication port at the entrance of the pressure chamber 31. Therefore, the intended volume of the pressure chamber 31 can be more easily achieved or set as compared to a configuration in which the entire width of the pressure chamber 31 is reduced rather than just an end portion. Accordingly, as compared to a configuration in which the entire width of the pressure chamber 31 would be reduced, there is less restriction on the placement, positioning, and size of nozzles 28, and thus the size of droplets and the ejection performance can be more easily maintained.

In an embodiment, the first common chamber 271 is provided on one side of the pressure chambers 31 from which fluid flows in and the second common chamber 272 is disposed on the other side of the pressure chambers 31 from which fluid flows out. However, embodiments are not limited thereto. For example, configuration may be adopted in which the common chambers on both sides of the pressure chambers 31 are a supply side (source) so that liquid flows in from both sides. In such a configuration, the fluid flows out only from the nozzle 28 disposed at the center or intermediate portion of the pressure chambers 31. Even in this case, by providing the throttle unit 240 or the throttle structure at the entry portions of both sides of each of the pressure chambers 31, the fluid resistance increases, and the ejection efficiency can be improved.

In an embodiment, the throttle unit 240 that increases the flow path resistance includes the pair of protrusion portions 241 that are formed on the wall surfaces of the side wall portions 33 on both sides of the pressure chamber 31. However, embodiments are not limited thereto. For example, in other examples, the throttle unit 240 may have a shape in which a protrusion is formed at a part of the bottom portion side of the pressure chambers 31 or at a part of the nozzle plate 12 side of the pressure chambers 31. Alternatively, the throttle unit 240 may have a shape in which a part of a region of the bottom portion side of the pressure chambers 31 is filled (blocked) with a photosensitive resin, such as a photoresist material or the like.

In one example, the throttle port 242 has a slit shape that extends in the third direction (Z-axis in the drawing) that is the depth direction of the pressure chamber 31, in other examples, the throttle port 242 may have a slit shape that extends in a different direction than the chamber depth direction or may have a different shape than the slit shape, such as a circular shape or an elliptical shape.

In an embodiment, cover units 23 and protrusion portions 241 are formed inside grooves forming the pressure chamber 31 and the dummy chamber 32. The cover units 23 and protrusion portions 241 are material that fills a part of the interior of the groove. However, the cover units 23 and the protrusion portions 241 are not limited thereto. For example, the photosensitive resin may be disposed on the outside of the grooves to form the throttle unit 240 to block a part of the communication port of the pressure chamber 31.

While in one embodiment, the actuator 22 with grooves is disposed on the main surface portion of the substrate 21, embodiments are not limited thereto. For example, the actuator 22 may be provided on an end surface of the substrate 21.

In addition, in one example, the nozzles 28 are arranged in two rows on the nozzle plate 12, but the number of nozzle rows or arrays is not limited thereto. For example, in some modified embodiments, the nozzles 28 may be provided in just one row or in three or more rows.

In an embodiment, the actuator base 11 with a stacked piezoelectric body in which piezoelectric members are stacked on the substrate 21 is used. However, in other examples, an actuator base 11 with only piezoelectric members without use of any substrate may be adopted. In some examples, a single piezoelectric member may be used instead of two piezoelectric members.

In some embodiments, the dummy chambers 32 may connect to (be open to) the first common chamber 271 or the second common chamber 272.

In some examples, the ink supply side and the ink discharge side of the pressure chambers 31 may be reversed or may be configured to be switchable or reversible.

In an example embodiment, a circulation type inkjet head is used. In such an embodiment, one side of the pressure chambers 31 is the supply side and the other side is the discharge side. The fluid flows into one side of the pressure chambers and flows out from the other side. However, embodiments are not limited to this example. The inkjet head may be a non-circulation type rather than a circulation type. In some such examples, a configuration may be adopted in which the common chambers on both sides of the pressure chambers 31 are the supply side so that liquid (e.g., ink) flows in from both sides. That is, a configuration may be adopted in which fluid flows in from both sides of the pressure chambers 31 and flows out only from the nozzles 28 disposed at the center of the pressure chambers 31. Even in this case, the fluid resistance increases, and the ejection efficiency can be improved by providing the throttle unit 240 on both sides of the pressure chambers 31 at the points of fluid inflow.

The liquid to be ejected is not limited to ink for printing. For example, liquid including conductive particles for forming a wiring pattern of a printed wiring board (printed circuit board) may also be used.

In an embodiment, the inkjet head 10 is used for a liquid ejection device, such as an inkjet printer. However, embodiments are not limited thereto. For example, in other embodiments, the inkjet head 10 or the like can be applied to a 3D printer, an industrial manufacturing machine, or medical uses, and in such applications, the size, weight and cost thereof can be reduced by adoption of the aspects of the present disclosure.

Embodiments of the present disclosure describe liquid ejecting heads providing stable ejection characteristics and methods of manufacturing such liquid ejecting heads.

While certain embodiments have been described, these embodiments are presented by way of example only and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A liquid ejection head, comprising:

an actuator including a plurality of pressure chambers and a plurality of dummy chambers, the pressure chambers each being portions of a groove between an adjacent pair of sidewalls, each pressure chamber in fluid communication with a nozzle for ejecting a liquid, the dummy chambers each being between an adjacent pair of pressure chambers;

a first common chamber fluidly connected to an end of each of the pressure chambers;

a first throttle portion at a first end portion of each pressure chamber, each first throttle portion blocking a part of a liquid flow path from the first common chamber to the pressure chamber, the first throttle portion being a resin material;

a second common chamber fluidly connected to a second end of each of the pressure chambers; and a second throttle portion at the second end portion of each pressure chamber, each second throttle portion blocking a part of the liquid flow path from the second common chamber to the pressure chamber, the second throttle portion being a resin material.

2. The liquid ejection head according to claim 1, wherein the first throttle portions are a cured photosensitive resin.

3. The liquid ejection head according to claim 1, wherein the first throttle portion comprises separate portions each contacting one of the adjacent pair of sidewalls of the pressure chamber.

4. The liquid ejection head according to claim 1, further comprising:

a nozzle plate on the actuator, the nozzle plate blocking an upper end of the plurality of grooves and including therein the nozzles for ejecting the liquid.

5. The liquid ejection head according to claim 4, wherein the first throttle portion contacts the nozzle plate.

6. The liquid ejection head according to claim 1, wherein each end portion of the dummy chambers is closed.

7. The liquid ejection head according to claim 1, wherein the ends of the dummy chambers are blocked so as to prevent fluid communication between the dummy chambers and the first common chamber.

8. The liquid ejection head according to claim 1, wherein the resin material of the first and second throttle portions is a cured photosensitive resin.

9. The liquid ejection head according to claim 1, wherein the second throttle portion comprises separate portions each contacting one of the adjacent pair of sidewalls of the pressure chamber.

10. The liquid ejection head according to claim 4, wherein the second throttle portion contacts the nozzle plate.

11. The liquid ejection head according to claim 1, wherein the ends of the dummy chambers are blocked so as to prevent fluid communication between the dummy chambers and the first and second common chambers.

12. A liquid ejection head, comprising:

an actuator including a plurality of pressure chambers, each respectively communicating with a liquid ejection nozzle, and a plurality of dummy chambers between adjacent pairs of the pressure chambers in a first direction, the pressure chambers and dummy chambers extending in a second direction intersecting the first direction;

a first common chamber connected to a first communication port at a first end portion of each of the pressure chambers;

a second common chamber connected to a second communication port a second end portion of each of the pressure chambers;

a first throttle unit at each of the first end portions of the pressure chamber; and a second throttle unit at each of the second end portions of the pressure chambers, wherein the first and second throttle units partially block the first and second communication ports, respectively.

13. The liquid ejection head according to claim 12, wherein each of the first and second throttle units includes:

a pair of protrusion portions facing each other in the first direction from adjacent sidewalls.

14. The liquid ejection head according to claim 13, wherein each of the protrusion portions is a cured photoresist material.

15. A method for manufacturing a liquid ejection head, comprising:

forming a plurality of side walls extending in a first direction with grooves therebetween in a second direction, the grooves being connected at one end to a first common chamber region and at an opposite end to a second common chamber region;

filling a photosensitive resin into at least a first end portion of the grooves to close off the grooves from the first common chamber region and into at least a second end portion of the grooves to close off the grooves from the second common chamber region; and selectively exposing the photosensitive resin in the grooves to light and then exposing the exposed photosensitive resin to a developer to remove portions of the photosensitive resin to form throttle portions in the first and second end portions of at least some of the grooves, the throttle portions partially blocking fluid flow between the first and second common chamber regions and the grooves.

16. The method according to claim 15, wherein the photosensitive resin is a photoresist material.

17. The method according to claim 15, wherein at least some of the grooves remain fully blocked after the throttle portions are formed.

18. The liquid ejection head according to claim 1, wherein each of the first and second throttle portions comprise separate portions each contacting one of the adjacent pair of sidewalls of the pressure chamber.

19. The liquid ejection head according to claim 1, wherein the resin material of the first and second throttle portions is formed from a photoresist material.

20. The liquid ejection head according to claim 13, wherein each of the protrusion portions are formed from a photoresist material.

* * * * *